US012802005B2

(12) United States Patent
Newman et al.

(10) Patent No.: US 12,802,005 B2
(45) Date of Patent: Nov. 17, 2026

(54) SYSTEM AND METHOD FOR SKILL-BASED CONTRACT ASSIGNMENT

(71) Applicant: JPMorgan Chase Bank, N.A., New York, NY (US)

(72) Inventors: Stacy A Newman, Easton, PA (US); Devin C Moore, Columbus, OH (US); Tom Martin, Lewis Center, OH (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 44 days.

(21) Appl. No.: 18/741,215

(22) Filed: Jun. 12, 2024

(65) Prior Publication Data

US 2025/0384363 A1 Dec. 18, 2025

(51) Int. Cl.
*G06Q 10/0631* (2023.01)

(52) U.S. Cl.
CPC ................ *G06Q 10/063112* (2013.01); *G06Q 10/063118* (2013.01); *G06Q 2220/00* (2013.01)

(58) Field of Classification Search
None
See application file for complete search history.

(56) References Cited

U.S. PATENT DOCUMENTS 9,015,301 B2 * 4/2015 Redlich ............... G06F 16/2465 707/777
2008/0114628 A1 5/2008 Johnson et al.
2019/0303926 A1 10/2019 Yantis et al.
2021/0012288 A1 * 1/2021 Mroczka ............ G06Q 10/0635
2021/0216346 A1 * 7/2021 Mahanta ................. G06F 16/29
2021/0241273 A1 8/2021 Abad et al.
(Continued)

FOREIGN PATENT DOCUMENTS

CN 110263498 B * 7/2021 ............. G06F 30/13
EP 4124953 A2 * 2/2023 ............. H04L 67/50

OTHER PUBLICATIONS

Flood, John, and Lachlan Robb. "Professions and expertise: how machine learning and blockchain are redesigning the landscape of professional knowledge and organization." U. Miami L. Rev. 73 (2018): 443. (Year: 2018).*
(Continued)

*Primary Examiner* — Thomas L Mansfield
(74) *Attorney, Agent, or Firm* — GREENBLUM & BERNSTEIN, P.L.C.

(57) ABSTRACT

Various methods and processes, apparatuses or systems, and media for enabling skill-based contract assignment for completing a particular project are disclosed. A processor trains a model on a set of known criteria data, a plurality of dimensions data, and volume data; and receives a request, via a user interface, from a user to assign the contract for completing the project by selecting criteria determining data. The model applies a weight to the selected criteria determining data; generates a forced-rank list of subject matter experts (SMEs) with rankings and contact information; and transmits the forced-rank list to the user interface. The processor receives user input from the user, via the user interface, establishing an agreement to select an SME from the forced-rank list; transmits an electronic message to the selected SME to accept the agreement; and sets the agreement into a contract on a blockchain to ensure accuracy and encryption.

18 Claims, 9 Drawing Sheets

100

(56) References Cited

U.S. PATENT DOCUMENTS

| | | | | |
|---|---|---|---|---|
| 2021/0342527 | A1* | 11/2021 | Kapcar | G06F 40/186 |
| 2021/0374276 | A1 | 12/2021 | Nayak et al. | |
| 2023/0061547 | A1* | 3/2023 | Russell | G06N 20/00 |
| 2023/0237491 | A1* | 7/2023 | Mardikar | G06Q 20/02<br>705/44 |

OTHER PUBLICATIONS

Kassab, Mohamad, et al. "Blockchain-engineers wanted: an empirical analysis on required skills, education and experience." 2021 IEEE/ACM 4th International Workshop on Emerging Trends in Software Engineering for Blockchain (WETSEB). IEEE, 2021. (Year: 2021).*

Official communications received in corresponding PCT/US2025/032475 application, dated Aug. 19, 2025.

* cited by examiner

200

300

500

600

700

800

900

SYSTEM AND METHOD FOR SKILL-BASED CONTRACT ASSIGNMENT

TECHNICAL FIELD

This disclosure generally relates to data processing, and, more particularly, to methods and apparatuses for implementing a platform, language, cloud, and database agnostic skill-based contract assignment module configured to enable skill-based contract assignment.

BACKGROUND

The developments described in this section are known to the inventors. However, unless otherwise indicated, it should not be assumed that any of the developments described in this section qualify as prior art merely by virtue of their inclusion in this section, or that these developments are known to a person of ordinary skill in the art.

Today, every modern organization appears to be drowning in data. It may prove to be a valuable asset that needs to be visible, understood, and trusted in order to drive an organization's profitability, innovation, and growth. For example, in working teams, organizations and companies there may be frequently a need for an additional resource to assist with a problem or project or program to ensure that the program or project meets its criteria for successful delivery. Many organizations may not have oversight into the holistic talent pool that may be available to help them. Without knowledge, projects may be delayed, designed inefficiently, and ultimately may fail to make it to production. There appears to be no easy way to source the optimal person for that need within a large company or group.

SUMMARY

The present disclosure, through one or more of its various aspects, embodiments, and/or specific features or sub-components, provides, among other features, various systems, servers, devices, methods, media, programs, and platforms for implementing a platform, language, cloud, and database agnostic skill-based contract assignment module configured to source human power and knowledge data in an easy and efficient way across multiple organizations, teams, or large companies based on multiple data sources, that stays evergreen based on reinforcement learning and holding contracts for governance or audit, but the disclosure is not limited thereto.

In some embodiments, a method for enabling skill-based contract assignment for completing a particular project or a program by utilizing one or more processors along with allocated memory is disclosed. The method may include: implementing a database that stores a set of known criteria data having either an equally distributed weighted percentage or adjustable weighted percentages to match an outcome state corresponding to the skill-based contract assignment; establishing a communication link among a user interface, a machine learning model, and the database via a communication interface; training the machine learning model on the set of known criteria data; receiving a request, via the user interface, from a user to assign a contract for completing the particular project or the program by selecting criteria determining data; applying, upon receiving the request, by the trained machine learning model, a weight to the selected criteria determining data; generating, by the trained machine learning model, a forced-rank list of subject matter experts (SMEs) with rankings and contact information based on applying the weight; transmitting the forced-rank list to the user interface; receiving user input from the user, via the user interface, establishing an agreement to select an SME from the forced-rank list; transmitting an electronic message to the selected SME to accept the agreement; setting the agreement into a contract on a blockchain upon receiving acceptance from the selected SME, to ensure accuracy, encryption, and that none of the data that has been utilized to generate the contract can be accessed without the user and the selected SME's knowledge.

In some embodiments, the method may include: selecting, by the user, the criteria determining data details giving the user an outcome of who would be in a forced-rank order, the most appropriate SME or SMEs qualified to assist the user for completing the particular project or the program.

In some embodiments, the method may include: transmitting a verification or survey to the user interface to receive user verification data or survey data as to why the user selected this particular SME from the forced-rank list.

In some embodiments, the method may include: retraining the machine learning model on the received verification data or the survey data; and outputting a reinforcement learning model.

In some embodiments, the reinforcement learning model may automatically adjusts weights such that utilization and engagement with the user interface increases over time.

In some embodiments, in automatically adjusting weights, the method may include: adjusting weights for an SME who has availability; and ranking said SME who has availability higher in the forced-rank list compared to SMEs who do not have availability.

In some embodiments, in automatically adjusting weights, the method may include: adjusting weights for an SME who has been selected the most previously by the user or other users; and ranking said SME who has been selected the most previously highest in the forced-rank list compared to other SMEs.

In some embodiments, when there is only one dimension, the method may include: applying weighting along a volume of output matching a determined sentiment such that 100% weighting is applied to an SME who has produced the most corresponding to the determined sentiment; and retraining the machine learning model on the volume of output matching the determined sentiment.

In some embodiments, when there is a plurality of dimensions, the method may include: applying weighting along the plurality of dimensions such that each one of the plurality of dimensions carries a percentage weight of the total 100% where the percentages at start are divided equally; and retraining the machine learning model on the percentage weights assigned to the plurality of dimensions.

In some embodiments, a system for enabling skill-based contract assignment for completing a particular project or a program is disclosed. The system may include: a processor; and a memory operatively connected to the processor via a communication interface, the memory storing computer readable instructions, when executed, may cause the processor to: implement a database that stores a set of known criteria data having either an equally distributed weighted percentage or adjustable weighted percentages to match an outcome state corresponding to the skill-based contract assignment; establish a communication link among a user interface, a machine learning model, and the database via a communication interface; train the machine learning model on the set of known criteria data; receive a request, via the user interface, from a user to assign a contract for completing the particular project or the program by selecting criteria determining data; apply, upon receiving the request, by the trained machine learning model, a weight to the selected criteria determining data; generate, by the trained machine learning model, a forced-rank list of SMEs with rankings and contact information based on applying the weight; transmit the forced-rank list to the user interface; receive user input from the user, via the user interface, establishing an agreement to select an SME from the forced-rank list; transmit an electronic message to the selected SME to accept the agreement; set the agreement into a contract on a blockchain upon receiving acceptance from the selected SME, to ensure accuracy, encryption, and that none of the data that has been utilized to generate the contract can be accessed without the user and the selected SME's knowledge.

In some embodiments, the processor may be further configured to: select, by the user, the criteria determining data details giving the user an outcome of who would be in a forced-rank order, the most appropriate SME or SMEs qualified to assist the user for completing the particular project or the program.

In some embodiments, the processor may be further configured to: transmit a verification or survey to the user interface to receive user verification data or survey data as to why the user selected this particular SME from the forced-rank list.

In some embodiments, the processor may be further configured to: retrain the machine learning model on the received verification data or the survey data; and output a reinforcement learning model.

In some embodiments, in automatically adjusting weights, the processor may be further configured to: adjust weights for an SME who has availability; and rank said SME who has availability higher in the forced-rank list compared to SMEs who do not have availability.

In some embodiments, in automatically adjusting weights, the processor may be further configured to: adjust weights for an SME who has been selected the most previously by the user or other users; and rank said SME who has been selected the most previously highest in the forced-rank list compared to other SMEs.

In some embodiments, when there is only one dimension, the processor may be further configured to: apply weighting along a volume of output matching a determined sentiment such that 100% weighting is applied to an SME who has produced the most corresponding to the determined sentiment; and retrain the machine learning model on the volume of output matching the determined sentiment.

In some embodiments, when there is a plurality of dimensions, the processor may be further configured to: apply weighting along the plurality of dimensions such that each one of the plurality of dimensions carries a percentage weight of the total 100% where the percentages at start are divided equally; and retrain the machine learning model on the percentage weights assigned to the plurality of dimensions.

In some embodiments, a non-transitory computer readable medium configured to store instructions for enabling skill-based contract assignment for completing a particular project or a program is disclosed. The instructions, when executed, may cause a processor to perform the following: implementing a database that stores a set of known criteria data having either an equally distributed weighted percentage or adjustable weighted percentages to match an outcome state corresponding to the skill-based contract assignment; establishing a communication link among a user interface, a machine learning model, and the database via a communication interface; training the machine learning model on the set of known criteria data; receiving a request, via the user interface, from a user to assign a contract for completing the particular project or the program by selecting criteria determining data; applying, upon receiving the request, by the trained machine learning model, a weight to the selected criteria determining data; generating, by the trained machine learning model, a forced-rank list of SMEs with rankings and contact information based on applying the weight; transmitting the forced-rank list to the user interface; receiving user input from the user, via the user interface, establishing an agreement to select an SME from the forced-rank list; transmitting an electronic message to the selected SME to accept the agreement; setting the agreement into a contract on a blockchain upon receiving acceptance from the selected SME, to ensure accuracy, encryption, and that none of the data that has been utilized to generate the contract can be accessed without the user and the selected SME's knowledge.

In some embodiments, the instructions, when executed, may cause the processor to further perform the following: selecting, by the user, the criteria determining data details giving the user an outcome of who would be in a forced-rank order, the most appropriate SME or SMEs qualified to assist the user for completing the particular project or the program.

In some embodiments, the instructions, when executed, may cause the processor to further perform the following: transmitting a verification or survey to the user interface to receive user verification data or survey data as to why the user selected this particular SME from the forced-rank list.

In some embodiments, the instructions, when executed, may cause the processor to further perform the following: retraining the machine learning model on the received verification data or the survey data; and outputting a reinforcement learning model.

In some embodiments, in automatically adjusting weights, the instructions, when executed, may cause the processor to further perform the following: adjusting weights for an SME who has availability; and ranking said SME who has availability higher in the forced-rank list compared to SMEs who do not have availability.

In some embodiments, in automatically adjusting weights, the instructions, when executed, may cause the processor to further perform the following: adjusting weights for an SME who has been selected the most previously by the user or other users; and ranking said SME who has been selected the most previously highest in the forced-rank list compared to other SMEs.

In some embodiments, when there is only one dimension, the instructions, when executed, may cause the processor to further perform the following: applying weighting along a volume of output matching a determined sentiment such that 100% weighting is applied to an SME who has produced the most corresponding to the determined sentiment; and retraining the machine learning model on the volume of output matching the determined sentiment.

In some embodiments, when there is a plurality of dimensions, the instructions, when executed, may cause the processor to further perform the following: applying weighting along the plurality of dimensions such that each one of the plurality of dimensions carries a percentage weight of the total 100% where the percentages at start are divided equally; and retraining the machine learning model on the percentage weights assigned to the plurality of dimensions.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
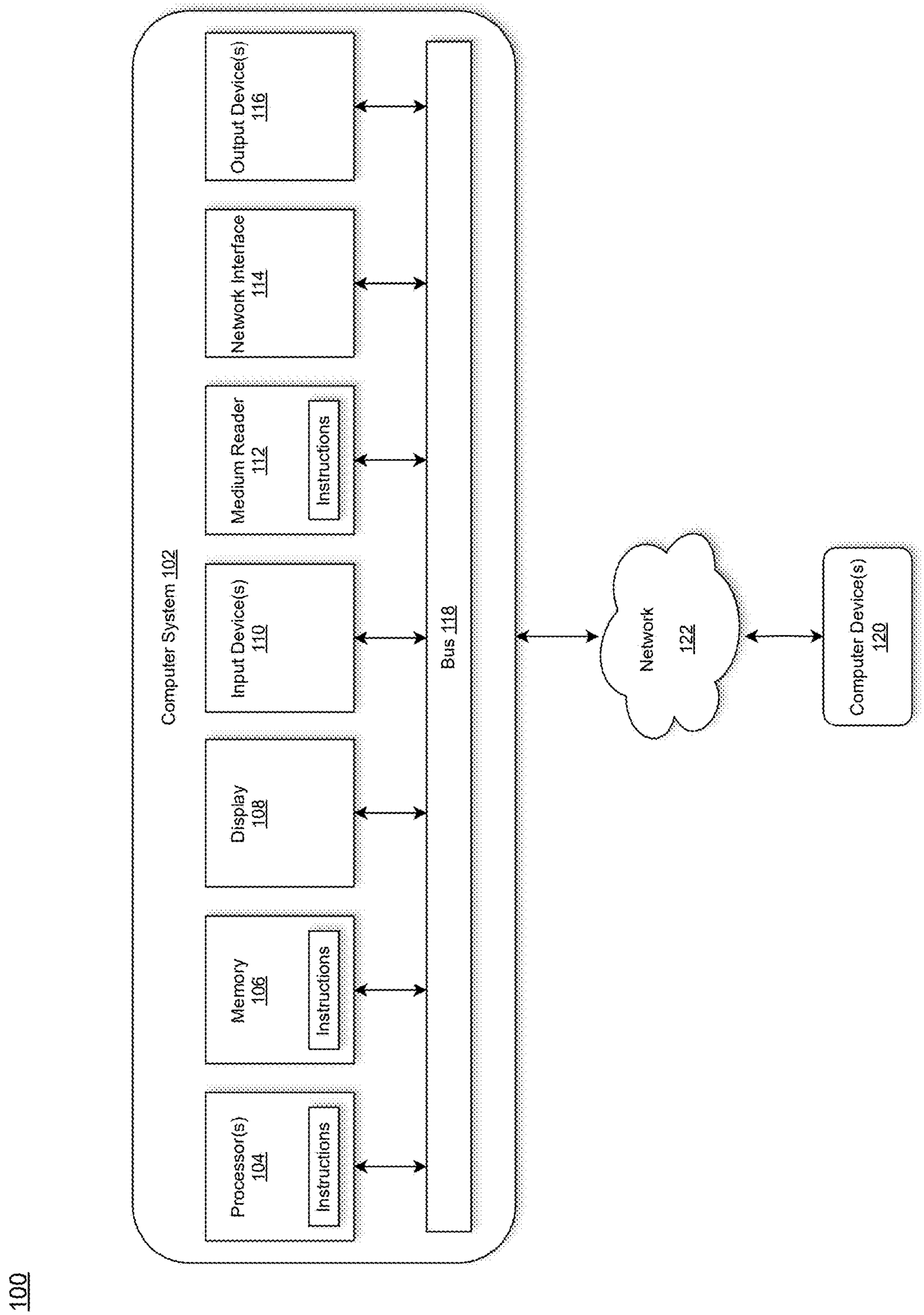
FIG. 1 illustrates a computer system for implementing a platform, language, database, and cloud agnostic skill-based contract assignment module configured for enabling skill-based contract assignment in accordance with an embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system 100 for use in implementing a platform, language, database, and cloud agnostic skill-based contract assignment module configured to source human power and knowledge data in an easy and efficient way across multiple organizations, teams, or large companies based on multiple data sources, that stays evergreen based on reinforcement learning and holding contracts for governance or audit in accordance with an embodiment. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a GPS device, a visual positioning system (VPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 104 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In some embodiments, the skill-based contract assignment module implemented by the system 100 may be platform, language, database, and cloud agnostic that may allow for consistent easy orchestration and passing of data through various components to output a desired result regardless of platform, browser, language, database, and cloud environment by writing programs accordingly. Since the disclosed process, in some embodiments, is platform, language, database, browser, and cloud agnostic, the skill-based contract assignment module may be independently tuned or modified for optimal performance without affecting the configuration or data files. The configuration or data files, in some embodiments, may be written using JSON, but the disclosure is not limited thereto. For example, the configuration or data files may easily be extended to other readable file formats such as XML, YAML, etc., or any other configuration based languages.

In accordance with various embodiments of the present disclosure, the methods described herein may be implemented using a hardware computer system that executes software programs. Further, in a non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
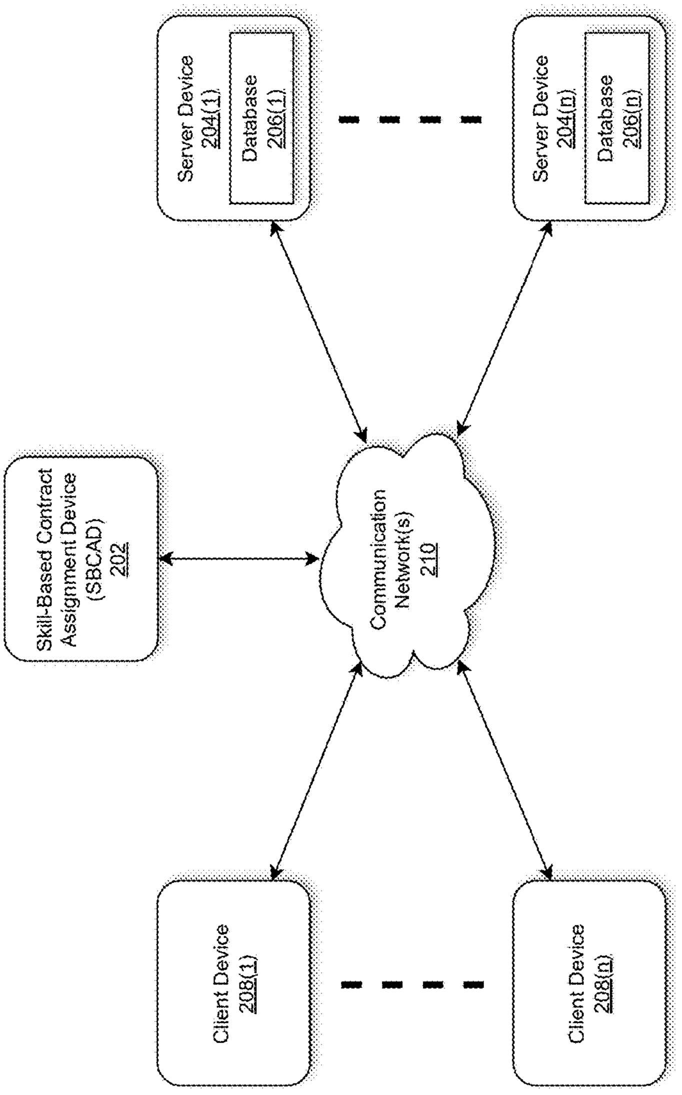
FIG. 2 illustrates an exemplary diagram of a network environment with a platform, language, database, and cloud agnostic skill-based contract assignment device in accordance with an embodiment.

Referring to FIG. 2, a schematic of an exemplary network environment 200 for implementing a language, platform, database, and cloud agnostic skill-based contract assignment device (SBCAD) of the instant disclosure is illustrated.

In some embodiments, the above-described problems associated with conventional tools may be overcome by implementing a SBCAD 202 as illustrated in FIG. 2 that may be configured for implementing a platform, language, database, and cloud agnostic skill-based contract assignment module configured to source human power and knowledge data in an easy and efficient way across multiple organizations, teams, or large companies based on multiple data sources, that stays evergreen based on reinforcement learning and holding contracts for governance or audit, but the disclosure is not limited thereto.

The SBCAD 202 may have one or more computer system 102*s*, as described with respect to FIG. 1, which in aggregate provide the necessary functions.

The SBCAD 202 may store one or more applications that can include executable instructions that, when executed by the SBCAD 202, cause the SBCAD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the SBCAD 202 itself, may be located in virtual server(s) running in a cloud-based computing environment rather than being tied to one or more specific physical network computing devices. Also, the application(s) may be running in one or more virtual machines (VMs) executing on the SBCAD 202. Additionally, in one or more embodiments of this technology, virtual machine(s) running on the SBCAD 202 may be managed or supervised by a hypervisor.

In the network environment 200 of FIG. 2, the SBCAD 202 is coupled to a plurality of server devices **204(1)-204(*n*) that hosts a plurality of databases 206(1)-206(*n*), and also to a plurality of client devices 208(1)-208(*n*) via communication network(s) 210. A communication interface of the SBCAD 202, such as the network interface 114 of the computer system 102 of FIG. 1, operatively couples and communicates between the SBCAD 202, the server devices 204(1)-204(*n*), and/or the client devices 208(1)-208(*n*), which are all coupled together by the communication network(s) 210**, although other types and/or numbers of communication networks or systems with other types and/or numbers of connections and/or configurations to other devices and/or elements may also be used.

The communication network(s) 210 may be the same or similar to the network 122 as described with respect to FIG. 1, although the SBCAD 202, the server devices **204(1)-204(*n*), and/or the client devices 208(1)-208(*n*) may be coupled together via other topologies. Additionally, the network environment 200** may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The SBCAD 202 may be a standalone device or integrated with one or more other devices or apparatuses, such as one or more of the server devices **204(1)-204(*n*), for example. In one particular example, the SBCAD 202 may be hosted by one of the server devices 204(1)-204(*n*), and other arrangements are also possible. Moreover, one or more of the devices of the SBCAD 202** may be in the same or a different communication network including one or more public, private, or cloud networks, for example.

The plurality of server devices **204(1)-204(*n*) may be the same or similar to the computer system 102 or the computer device 120 as described with respect to FIG. 1, including any features or combination of features described with respect thereto. For example, any of the server devices 204(1)-204(*n*) may include, among other features, one or more processors, a memory, and a communication interface, which are coupled together by a bus or other communication link, although other numbers and/or types of network devices may be used. The server devices 204(1)-204**(*n*) in this example may process requests received from the SBCAD 202 via the communication network(s) 210 according to the HTTP-based and/or JavaScript Object Notation (JSON) protocol, for example, although other protocols may also be used.

The server devices 204(1)-204(*n*) may be hardware or software or may represent a system with multiple servers in a pool, which may include internal or external networks. The server devices 204(1)-204(*n*) hosts the databases 206(1)-206 (*n*) that are configured to store metadata sets, data quality rules, and newly generated data.

Although the server devices 204(1)-204(*n*) are illustrated as single devices, one or more actions of each of the server devices 204(1)-204(*n*) may be distributed across one or more distinct network computing devices that together comprise one or more of the server devices 204(1)-204(*n*). Moreover, the server devices 204(1)-204(*n*) are not limited to a particular configuration. Thus, the server devices 204 (1)-204(*n*) may contain a plurality of network computing devices that operate using a master/slave approach, whereby one of the network computing devices of the server devices 204(1)-204(*n*) operates to manage and/or otherwise coordinate operations of the other network computing devices.

The server devices 204(1)-204(*n*) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(*n*) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(*n*) or other client devices 208(1)-208(*n*).

In some embodiments, the client devices 208(1)-208(*n*) in this example may include any type of computing device that can facilitate the implementation of the SBCAD 202 that may efficiently provide a platform for implementing a platform, language, database, and cloud agnostic skill-based contract assignment module configured to source human power and knowledge data in an easy and efficient way across multiple organizations, teams, or large companies based on multiple data sources, that stays evergreen based on reinforcement learning and holding contracts for governance or audit, but the disclosure is not limited thereto.

The client devices 208(1)-208(*n*) may run interface applications, such as standard web browsers or standalone client applications, which may provide an interface to communicate with the SBCAD 202 via the communication network(s) 210 in order to communicate user requests. The client devices 208(1)-208(*n*) may further include, among other features, a display device, such as a display screen or touchscreen, and/or an input device, such as a keyboard, for example.

Although the exemplary network environment 200 with the SBCAD 202, the server devices 204(1)-204(*n*), the client devices 208(1)-208(*n*), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as may be appreciated by those skilled in the relevant art(s).

One or more of the devices depicted in the network environment 200, such as the SBCAD 202, the server devices 204(1)-204(*n*), or the client devices 208(1)-208(*n*), for example, may be configured to operate as virtual instances on the same physical machine. For example, one or more of the SBCAD 202, the server devices 204(1)-204 (*n*), or the client devices 208(1)-208(*n*) may operate on the same physical device rather than as separate devices communicating through communication network(s) 210. Additionally, there may be more or fewer SBCADs 202, server devices 204(1)-204(*n*), or client devices 208(1)-208(*n*) than illustrated in FIG. 2. In some embodiments, the SBCAD 202 may be configured to send code at run-time to remote server devices 204(1)-204(*n*), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
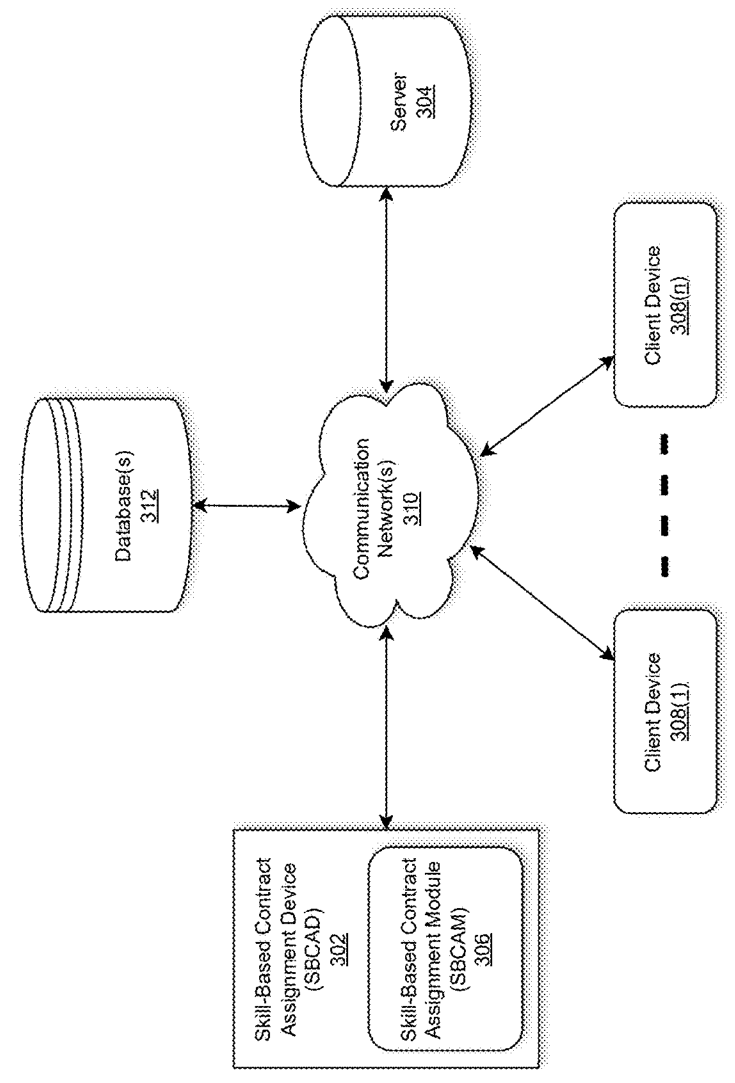
FIG. 3 illustrates a system diagram for implementing a platform, language, database, and cloud agnostic skill-based contract assignment device having a platform, language, database, and cloud agnostic skill-based contract assignment module in accordance with an embodiment.

FIG. 3 illustrates a system diagram for implementing a platform, language, and cloud agnostic SBCAD having a platform, language, database, and cloud agnostic skill-based contract assignment module (SBCAM) in accordance with an embodiment.

As illustrated in FIG. 3, the system 300 may include an SBCAD 302 within which an SBCAM 306 is embedded, a server 304, a database(s) 312, a plurality of client devices 308(1) . . . 308(*n*), and a communication network 310.

In some embodiments, the SBCAD 302 including the SBCAM 306 may be connected to the server 304, and the database(s) 312 via the communication network 310. The SBCAD 302 may also be connected to the plurality of client devices 308(1) . . . 308(*n*) via the communication network 310, but the disclosure is not limited thereto. The database(s) 312 may include rule database.

In an embodiment, the SBCAD 302 is described and shown in FIG. 3 as including the SBCAM 306, although it may include other rules, policies, modules, databases, or applications, for example. In some embodiments, the database(s) 312 may be configured to store ready to use modules written for each API for all environments. Although only one database is illustrated in FIG. 3, the disclosure is not limited thereto. Any number of desired databases may be utilized for use in the disclosed invention herein. The database(s) 312 may be a mainframe database, a log database that may produce programming for searching, monitoring, and analyzing machine-generated data via a web interface, etc., but the disclosure is not limited thereto. In addition, the database(s) 312 may store the large code bases models as directed graphs and graph metrics and graph centrality measures.

In some embodiments, the SBCAM 306 may be configured to receive real-time feed of data from the plurality of client devices 308(1) . . . 308(*n*) and secondary sources via the communication network 310.

As may be described below, the SBCAM 306 may be configured to: implement a database that stores a set of known criteria data having either an equally distributed weighted percentage or adjustable weighted percentages to match an outcome state corresponding to the skill-based contract assignment; establish a communication link among a user interface, a machine learning model, and the database via a communication interface; train the machine learning model on the set of known criteria data; receive a request, via the user interface, from a user to assign a contract for completing the particular project or the program by selecting criteria determining data; apply, upon receiving the request, by the trained machine learning model, a weight to the selected criteria determining data; generate, by the trained machine learning model, a forced-rank list of SMEs with rankings and contact information based on applying the weight; transmit the forced-rank list to the user interface; receive user input from the user, via the user interface, establishing an agreement to select an SME from the forced-rank list; transmit an electronic message to the selected SME to accept the agreement; set the agreement into a contract on a blockchain upon receiving acceptance from the selected SME, to ensure accuracy, encryption, and that none of the data that has been utilized to generate the contract can be accessed without the user and the selected SME's knowledge, but the disclosure is not limited thereto.

The plurality of client devices 308(1) . . . 308(*n*) are illustrated as being in communication with the SBCAD 302. In this regard, the plurality of client devices 308(1) . . . 308(*n*) may be "clients" (e.g., customers) of the SBCAD 302 and are described herein as such. Nevertheless, it is to be known and understood that the plurality of client devices 308(1) . . . 308(*n*) need not necessarily be "clients" of the SBCAD 302, or any entity described in association therewith herein. Any additional or alternative relationship may exist between either or both of the plurality of client devices 308(1) . . . 308(*n*) and the SBCAD 302, or no relationship may exist.

The first client device 308(1) may be, for example, a smart phone. Of course, the first client device 308(1) may be any additional device described herein. The second client device 308(*n*) may be, for example, a personal computer (PC). Of course, the second client device 308(*n*) may also be any additional device described herein. In some embodiments, the server 304 may be the same or equivalent to the server device 204 as illustrated in FIG. 2.

The process may be executed via the communication network 310, which may comprise plural networks as described above. For example, in an embodiment, one or more of the plurality of client devices 308(1) . . . 308(*n*) may communicate with the SBCAD 302 via broadband or cellular communication. Of course, these embodiments are merely exemplary and are not limiting or exhaustive.

The computing device 301 may be the same or similar to any one of the client devices 208(1)-208(*n*) as described with respect to FIG. 2, including any features or combination of features described with respect thereto. The SBCAD 302 may be the same or similar to the SBCAD 202 as described with respect to FIG. 2, including any features or combination of features described with respect thereto.

Figure 4:
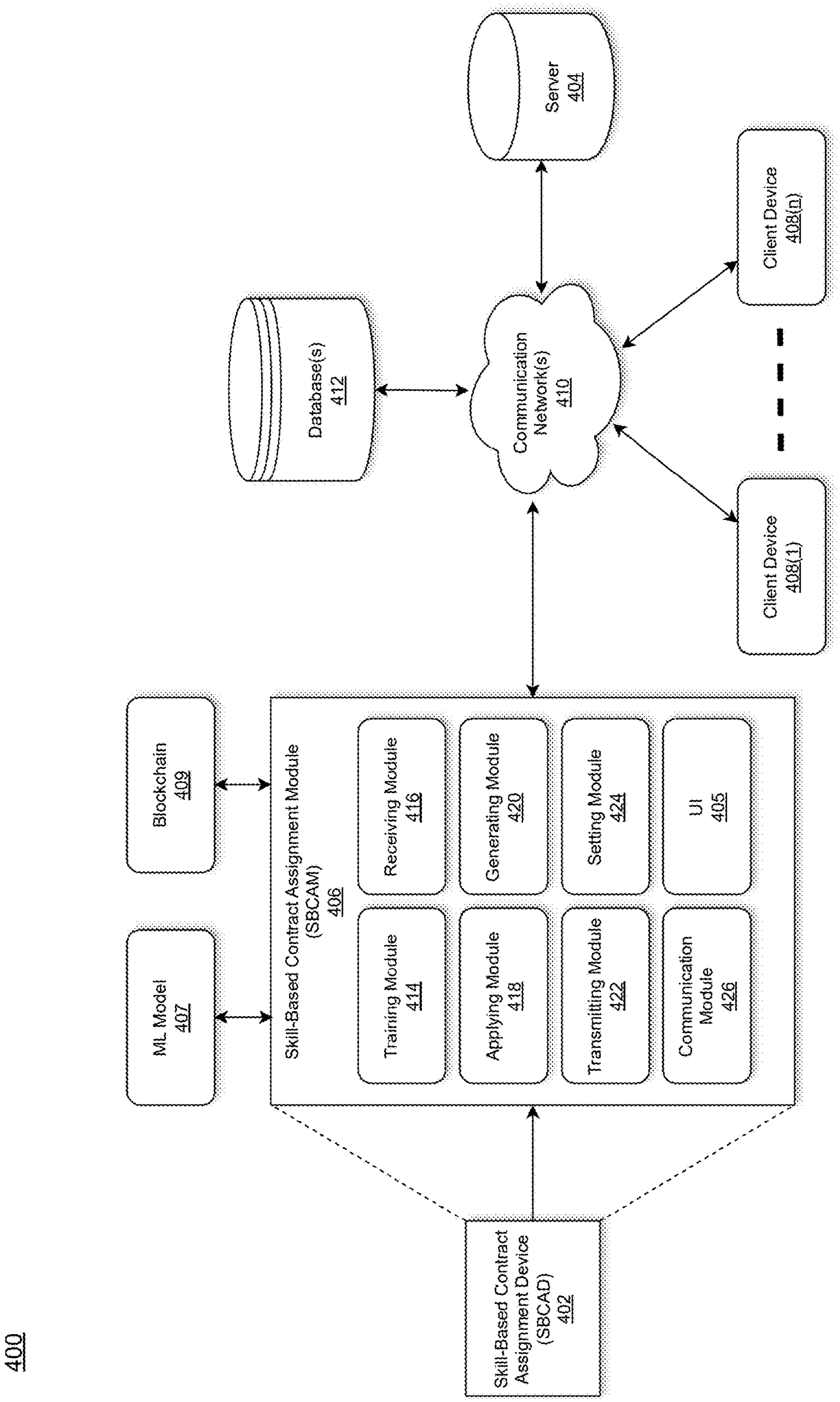
FIG. 4 illustrates a system diagram for implementing a platform, language, database, and cloud agnostic skill-based contract assignment module of FIG. 3 in accordance with an embodiment.

FIG. 4 illustrates a system diagram for implementing a platform, language, database, and cloud agnostic SBCAM of FIG. 3 in accordance with an embodiment.

In some embodiments, the system 400 may include a platform, language, database, and cloud agnostic SBCAD 402 within which a platform, language, database, and cloud agnostic SBCAM 406 is embedded, a server 404, a machine learning (ML) model 407, a blockchain 409, database(s) 412 that may store a set of known criteria data having either an equally distributed weighted percentage or adjustable weighted percentages to match an outcome state corresponding to the skill-based contract assignment, and a communication network 410. In some embodiments, server 404 may comprise a plurality of servers located centrally or located in different locations, but the disclosure is not limited thereto.

In some embodiments, the SBCAD 402 including the SBCAM 406 may be connected to the server 404, the ML model 407, the blockchain 409, and the database(s) 412 via the communication network 410. The SBCAD 402 may also be connected to the plurality of client devices 408(1)-408(*n*) via the communication network 410, but the disclosure is not limited thereto. The SBCAM 406, the server 404, the plurality of client devices 408(1)-408(*n*), the database(s) 412, the communication network 410 as illustrated in FIG. 4 may be the same or similar to the SBCAM 306, the server 304, the plurality of client devices 308(1)-308(*n*), the database(s) 312, the communication network 310, respectively, as illustrated in FIG. 3.

Details of the SBCAM 406 is provided below with corresponding modules that may be configured to source human power and knowledge data in an easy and efficient way across multiple organizations, teams, or large companies based on multiple data sources, that stays evergreen based on reinforcement learning and holding contracts for governance or audit.

In some embodiments, as illustrated in FIG. 4, the SBCAM 406 may include a training module 414, a receiving module 416, an applying module 418, a generating module 420, a transmitting module 422, a setting module 424, a communication module 426, and a graphical user interface (UI) 405. In some embodiments, interactions and data exchange among these modules included in the SBCAM 406 provide the advantageous effects of the disclosed invention. Functionalities of each module of FIG. 4 may be described in detail below with reference to FIGS. 4-11.

In some embodiments, each of the training module 414, receiving module 416, applying module 418, generating module 420, transmitting module 422, setting module 424, and the communication module 426 of the SBCAM 406 of FIG. 4 may be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies.

In some embodiments, each of the training module 414, receiving module 416, applying module 418, generating module 420, transmitting module 422, setting module 424, and the communication module 426 of the SBCAM 406 of FIG. 4 may be implemented by microprocessors or similar, and may be programmed using software (e.g., microcode) to perform various functions discussed herein and may optionally be driven by firmware and/or software.

Alternatively, in some embodiments, each of the training module 414, receiving module 416, applying module 418, generating module 420, transmitting module 422, setting module 424, and the communication module 426 of the SBCAM 406 of FIG. 4 may be implemented by dedicated hardware, or as a combination of dedicated hardware to perform some functions and a processor (e.g., one or more programmed microprocessors and associated circuitry) to perform other functions, but the disclosure is not limited thereto. For example, the SBCAM 406 of FIG. 4 may also be implemented by cloud based deployment.

In some embodiments, each of the training module 414, receiving module 416, applying module 418, generating module 420, transmitting module 422, setting module 424, and the communication module 426 of the SBCAM 406 of FIG. 4 may be called via corresponding API, but the disclosure is not limited thereto.

In some embodiments, the process implemented by the SBCAM 406 may be executed via the communication module 426 and the communication network 410, which may comprise plural networks as described above. For example, in an embodiment, the various components of the SBCAM 406 may communicate with the server 404, the ML model 407, the blockchain 409, and the database(s) 412 via the communication module 426 and the communication network 410 and the results including any topology graphs, tables, list of SMEs, etc., may be displayed onto the UI 405. Of course, these embodiments are merely exemplary and are not limiting or exhaustive. The database(s) 412 may include the databases included within the private cloud and/or public cloud and the server 404 may include one or more servers within the private cloud and the public cloud.

Figure 5:
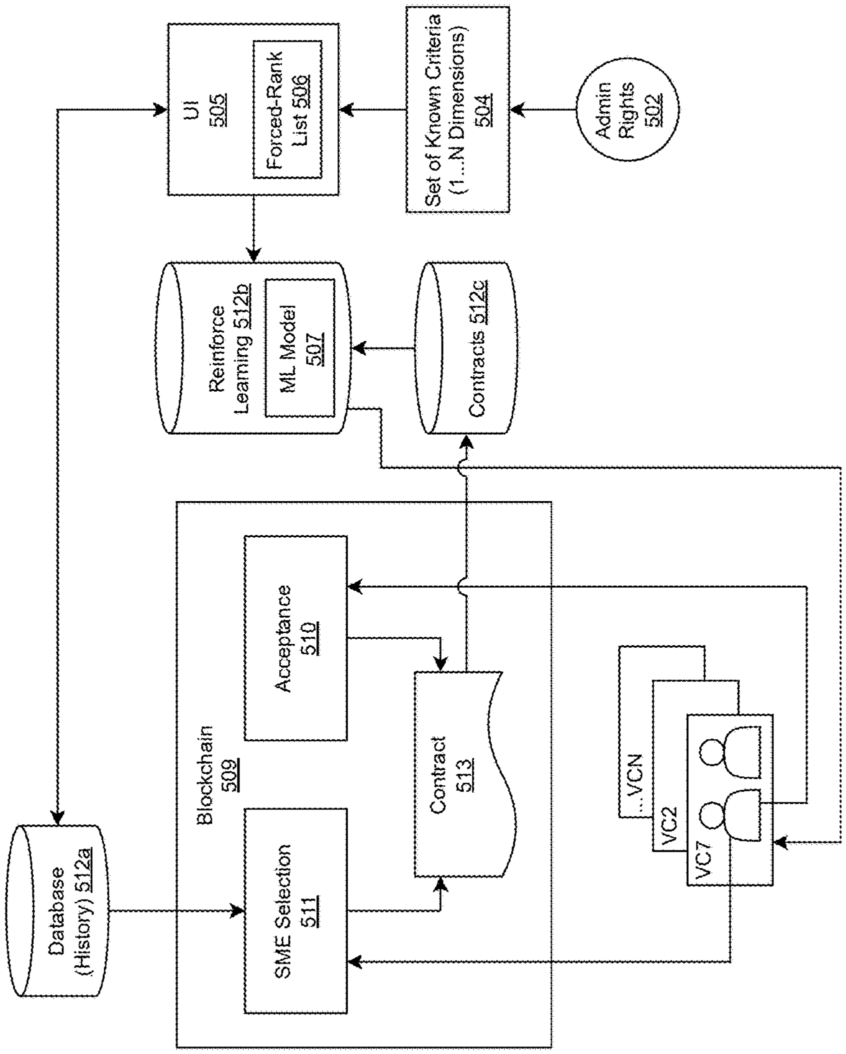
FIG. 5 illustrates an exemplary flow diagram of a process implemented by the platform, language, database, and cloud agnostic skill-based contract assignment module of FIG. 4 for SME determination in accordance with an embodiment.

FIG. 5 illustrates an exemplary flow diagram of a process 500 implemented by the platform, language, database, and cloud agnostic SBCAM 406 of FIG. 4 for SME determination in accordance with an embodiment. The process 500 as illustrated in FIG. 5, may include a block for set of known criteria (1 . . . N dimensions) 504 received from admin rights 502. The set of known criteria 504 may be hardcoded, may be edited, and may be dynamic on sentiment and dimension percentage match. For example, the set of known criteria 504 may include data having either an equally distributed weighted percentage or adjustable weighted percentages to match an outcome state corresponding to the skill-based contract assignment. Data from the set of known criteria 504 block may be presented to the UI 505 upon receiving a request from a user to search for SMEs for a particular desired project or a program. The UI 505 may display a forced-rank list 506 for user's selection. The user may also utilize history data corresponding to SMEs and other projects or programs from the database 512*a* in deciding for selection a particular SME (i.e., VC7, VC2, . . . . VCN) for completing the user's project or program. For example, the blockchain 509 may include block for SME selection 511, a block for Acceptance 510. After selecting a particular SME by the user, a notification may be sent to that particular SME for his/her acceptance 510. Upon acceptance by that particular SME, an electronic contract 513 may be generated and stored onto the contracts 512*c* database. Data from the contracts 512*c* database may flow to the reinforce learning 512*b* which may also include the ML model 507.

For example, referring back to FIGS. 4 and 5, in some embodiments, the SBCAM 406 may be configured to implement a database 412 that stores a set of known criteria 504 data having either an equally distributed weighted percentage or adjustable weighted percentages to match an outcome state corresponding to the skill-based contract assignment. The SBCAM 406 may be configured to establish a communication link among the UI 405, 505, an ML model 407, 507, and the database 412, 512*a*, 512*b*, 512*c* via a communication interface, i.e., the communication module 426.

In some embodiments, the training module 414 may be configured to train the ML model 407, 507 on the set of known criteria 504, history data, volume data, dimensions, etc., but the disclosure is not limited thereto. The receiving module 416 may be configured to receive a request, via the UI 405, 505, from a user to assign a contract for completing the particular project or the program by selecting criteria determining data.

In some embodiments, the applying module 418 may be configured to apply, upon receiving the request, by the trained ML model 407, 507, a weight to the selected criteria determining data. The generating module 420 may be configured to cause the trained ML model 407, 507 to generate a forced-rank list 506 of SMEs with rankings and contact information based on applying the weight. The transmitting module 422 may be configured to transmit the forced-rank list 506 to the UI 405, 505.

In some embodiments, the receiving module 416 may be further configured to receive user input from the user, via the UI 405, 505, establishing an agreement to select an SME from the forced-rank list 506. The transmitting module 422 may be configured to transmit an electronic message (i.e. email, text, or any other form of electronic communication) to the selected SME to accept the agreement. The setting module 424 may be configured to set the agreement into a contract on the blockchain 409, 509 upon receiving acceptance from the selected SME (i.e., VC7 as illustrated in FIG. 5) to ensure accuracy, encryption, and that none of the data that has been utilized to generate the contract may be accessed without the user and the selected SME's knowledge.

In some embodiments, the user may select, by utilizing the UI 405, 505, the criteria determining data details giving the user an outcome of who would be in a forced-rank order, the most appropriate SME or SMEs qualified to assist the user for completing the particular project or the program.

In some embodiments, the transmitting module 422 may be further configured to transmit a verification or survey to the UI 405, 505 to receive user verification data or survey data as to why the user selected this particular SME from the forced-rank list 506.

In some embodiments, the training module 414 may be further configured to retrain the ML model 407, 507 on the received verification data or the survey data; and output a reinforcement learning model (i.e., ML model 507 as illustrated in FIG. 5) and save onto the reinforce learning 512*b* database.

In some embodiments, in automatically adjusting weights, the ML model 407, 507 may be further configured to: adjust weights for an SME who has availability; and rank the SME who has availability higher in the forced-rank list 506 compared to SMEs who do not have availability.

In some embodiments, in automatically adjusting weights, the ML model 407, 507 may be further configured to: adjust weights for an SME who has been selected the most previously by the user or other users; and rank the SME who has been selected the most previously highest in the forced-rank list compared to other SMEs.

In some embodiments, when there is only one dimension, the applying module 418 may be further configured to apply weighting along a volume of output matching a determined sentiment such that 100% weighting is applied to an SME who has produced the most corresponding to the determined sentiment; and the training module 414 may be configured to retrain the ML model 407, 507 on the volume of output matching the determined sentiment. For example, if there is a sentiment to find a java developer and the only dimension is version control, then 100% of the weighting is on who has produced the most java code.

In some embodiments, when there is a plurality of dimensions, the applying module 418 may be further configured to apply weighting along the plurality of dimensions such that each one of the plurality of dimensions carries a percentage weight of the total 100% where the percentages at start are divided equally; and the training module 414 may be configured to retrain the ML model 407, 507 on the percentage weights assigned to the plurality of dimensions.

For example, if there are multiple dimensions, then each one carries a percentage weight of the total 100% where the percentages at the start are divided equally. The reinforcement learning includes automatically adjusting the weights such that the utilization and engagement with the platform increases over time. Weights may adjust for who has availability, and what the most engaged dimensions were over time, such as if people with high score in one dimension tend to get picked more often, then the weights may bias in or out of their favor depending on which causes less people to be benched.

Figure 6:
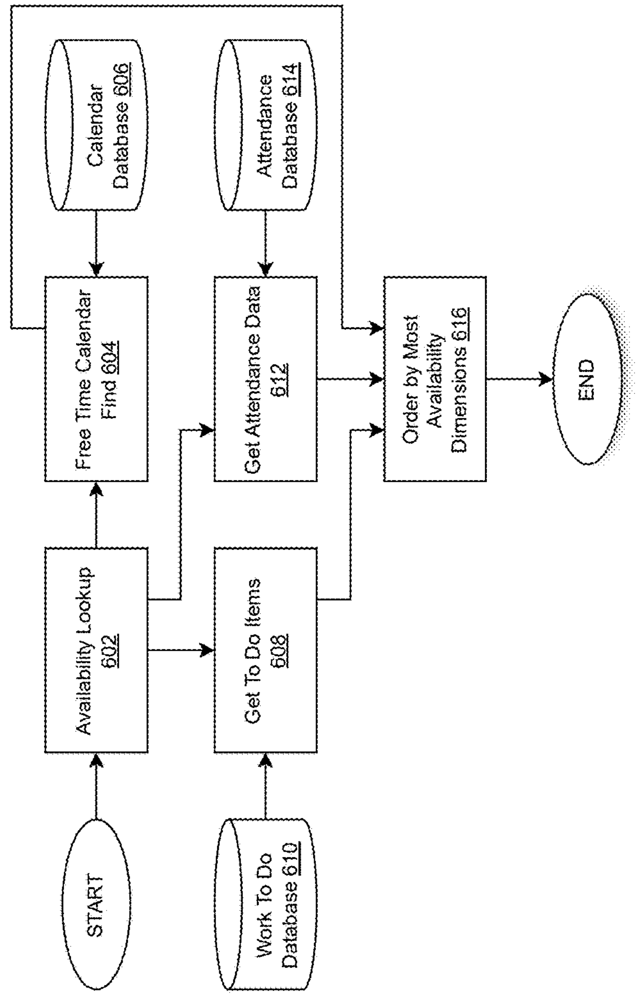
FIG. 6 illustrates an exemplary flow diagram of a process implemented by the platform, language, database, and cloud agnostic skill-based contract assignment module of FIG. 4 for assigning a contract based on selecting most available SME in accordance with an embodiment.

FIG. 6 illustrates an exemplary flow diagram of a process 600 implemented by the platform, language, database, and cloud agnostic SBCAM 406 of FIG. 4 for assigning a contract based on selecting most available SME in accordance with an embodiment. As illustrated in FIG. 6, at step 602, the process 600 may including looking for available SMEs by accessing an availability look up table, which has been generated from free time calendar find 604 block that received SME free time data from the calendar database 606. At step 608, the process 600 may include obtaining data related to "to do" items corresponding to a particular project or program that the user wants to complete by selecting an available SME. Data related to "to do" items may be accessed from the work to do database 610. At step 612, the process 600 may include obtaining attendance data corresponding to the available SMEs from an attendance database 614. At step 616, the process may include generating a list of SMEs ordered by most availability dimensions based on data received from to do items, free time calendar find, and the attendance data. For example, the most available SME would be assigned the highest weight value or percentage.

Figure 7:
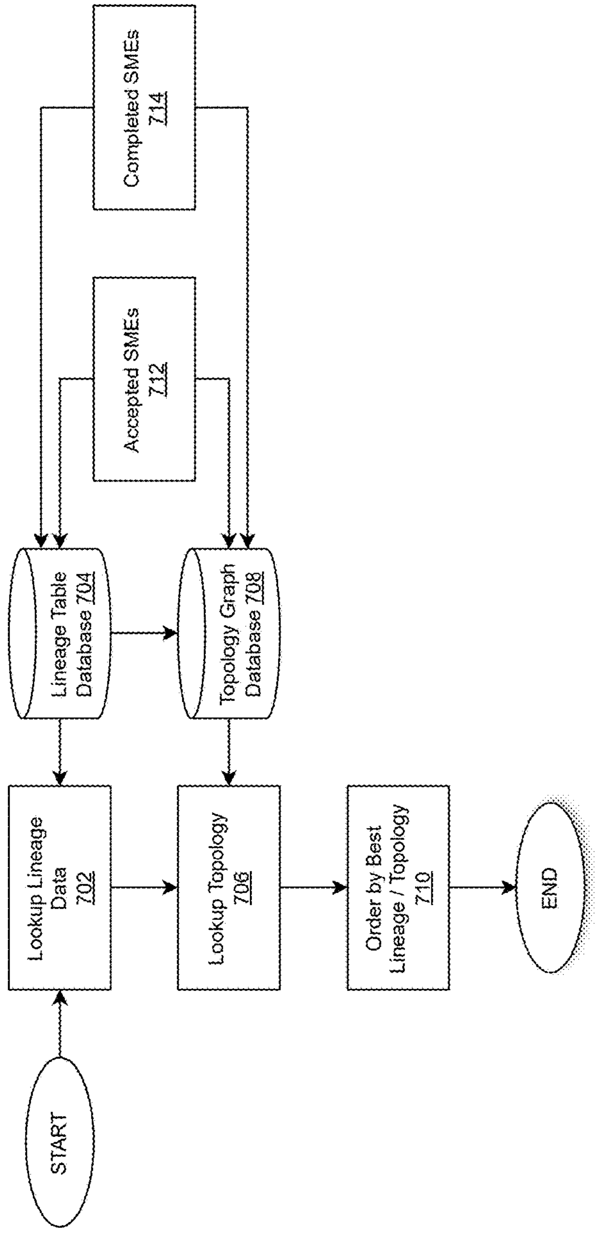
FIG. 7 illustrates an exemplary flow diagram of a process implemented by the platform, language, database, and cloud agnostic skill-based contract assignment module of FIG. 4 for assigning a contract based on selecting an SME who has the best lineage or topology in accordance with an embodiment.

FIG. 7 illustrates an exemplary flow diagram of a process 700 implemented by the platform, language, database, and cloud agnostic SBCAM 406 of FIG. 4 for assigning a contract based on selecting an SME who has the best lineage or topology in accordance with an embodiment. For example, at step 702 of the process 700, lookup lineage data may be obtained by accessing a lineage table database 704. At step 704, the process 700 may include obtaining lookup topology by accessing a topology graph database 708. At step 710, the process 700 may include generating a list of SMEs ordered by best lineage or topology. Lineage look up may include corresponding SME name or identifier, SME topic, date or time selected, date or time agreed, time to agree or respond, etc., but the disclosure is not limited thereto.

Figure 8:
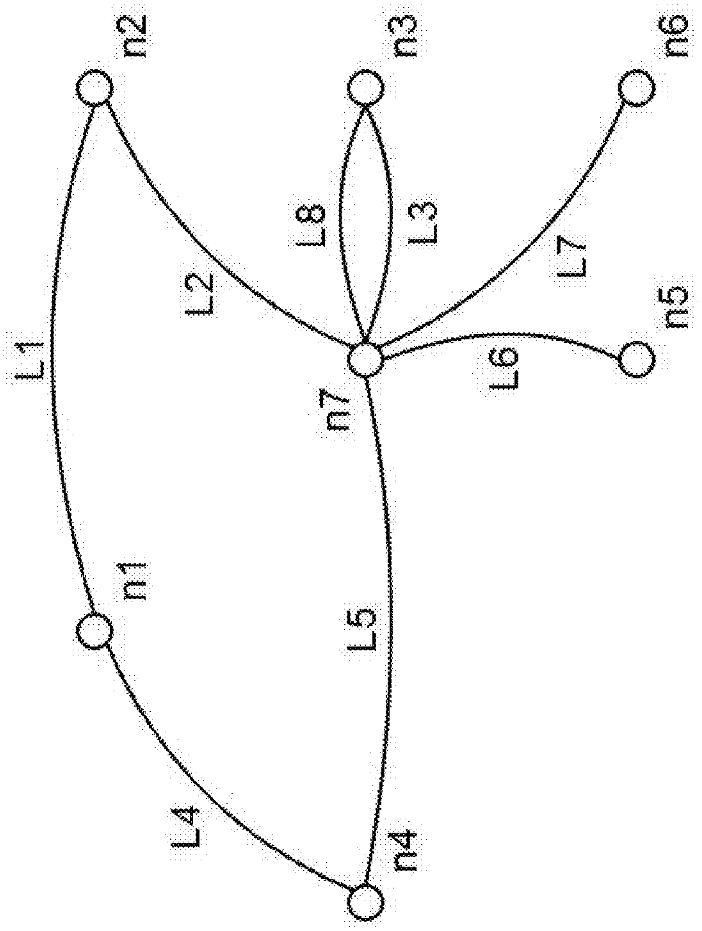
FIG. 8 illustrates an exemplary topology graph implemented by the platform, language, database, and cloud agnostic skill-based contract assignment module of FIG. 4 in accordance with an embodiment.

For example, FIG. 8 illustrates an exemplary topology graph 800 implemented by the platform, language, database, and cloud agnostic SBCAM 406 of FIG. 4 in accordance with an embodiment. The exemplary topology graph 800 illustrates nodes n1, n2, n3, n4, n5, n6, and n7. Each node includes corresponding name or identifier and represents corresponding vertex. Nodes n1 and n2 may be connected by lineage vector reference line L1; nodes n2 and n7 may be connected by lineage vector reference line L2; nodes n3 and n7 may be connected by lineage vector reference line L3; nodes n1 and n4 may be connected by lineage vector reference line L4; nodes n4 and n7 may be connected by lineage vector reference line L5; nodes n7 and n5 may be connected by lineage vector reference line L6; nodes n7 and n6 may be connected by lineage vector reference line L7; and nodes n7 and n3 may also be connected by lineage vector reference line L8. As illustrated in the topology graph 800, L3 and L8 repeat engagement over time. Node n7 has the maximum topology vertex regardless of lineage thereby query agnostic. Nodes n3, n1, n7 and n4 may represent maximum lineage. If L1=L2, then node n2 may represent maximum lineage, but the disclosure is not limited thereto.

Figure 9:
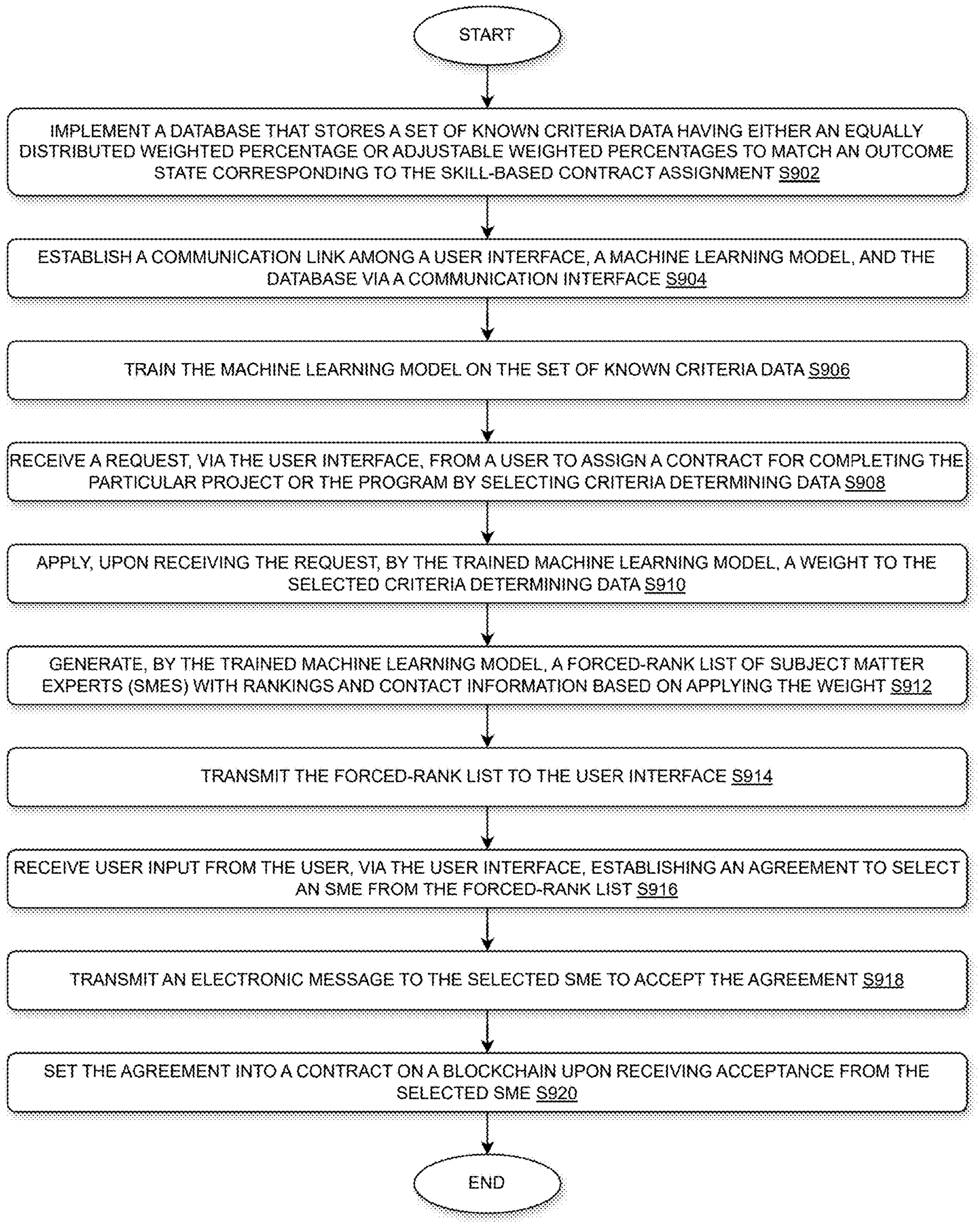
FIG. 9 illustrates an exemplary flow chart of a process implemented by the platform, language, database, and cloud agnostic skill-based contract assignment module of FIG. 4 for enabling skill-based contract assignment in accordance with an embodiment.

FIG. 9 illustrates an exemplary flow chart of a process 900 implemented by the platform, language, database, and cloud agnostic SBCAM 406 of FIG. 4 for sourcing human power and knowledge data in an easy and efficient way across multiple organizations, teams, or large companies based on multiple data sources, that stays evergreen based on reinforcement learning and holding contracts for governance or audit in accordance with an embodiment. It may be appreciated that the illustrated process 900 and associated steps may be performed in a different order, with illustrated steps omitted, with additional steps added, or with a combination of reordered, combined, omitted, or additional steps.

As illustrated in FIG. 9, at step S902, the process 900 may include implementing a database that stores a set of known criteria data having either an equally distributed weighted percentage or adjustable weighted percentages to match an outcome state corresponding to the skill-based contract assignment.

At step S904, the process 900 may include establishing a communication link among a user interface, a machine learning model, and the database via a communication interface.

At step S906, the process 900 may include training the machine learning model on the set of known criteria data.

At step S908, the process 900 may include receiving a request, via the user interface, from a user to assign a contract for completing the particular project or the program by selecting criteria determining data.

At step S910, the process 900 may include applying, upon receiving the request, by the trained machine learning model, a weight to the selected criteria determining data.

At step S912, the process 900 may include generating, by the trained machine learning model, a forced-rank list of SMEs with rankings and contact information based on applying the weight.

At step S914, the process 900 may include transmitting the forced-rank list to the user interface.

At step S916, the process 900 may include receiving user input from the user, via the user interface, establishing an agreement to select an SME from the forced-rank list.

At step S918, the process 900 may include transmitting an electronic message to the selected SME to accept the agreement.

At step S920, the process 900 may include setting the agreement into a contract on a blockchain upon receiving acceptance from the selected SME, to ensure accuracy, encryption, and that none of the data that has been utilized to generate the contract can be accessed without the user and the selected SME's knowledge.

In some embodiments, the process 900 may include: selecting, by the user, the criteria determining data details giving the user an outcome of who would be in a forced-rank order, the most appropriate SME or SMEs qualified to assist the user for completing the particular project or the program.

In some embodiments, the process 900 may include: transmitting a verification or survey to the user interface to receive user verification data or survey data as to why the user selected this particular SME from the forced-rank list.

In some embodiments, the process 900 may include: retraining the machine learning model on the received verification data or the survey data; and outputting a reinforcement learning model.

In some embodiments, in the process 900, the reinforcement learning model may automatically adjusts weights such that utilization and engagement with the user interface increases over time.

In some embodiments, in automatically adjusting weights by the reinforcement learning model, the process 900 may include: adjusting weights for an SME who has availability; and ranking said SME who has availability higher in the forced-rank list compared to SMEs who do not have availability.

In some embodiments, in automatically adjusting weights by reinforcement learning model, the process 900 may include: adjusting weights for an SME who has been selected the most previously by the user or other users; and ranking said SME who has been selected the most previously highest in the forced-rank list compared to other SMEs.

In some embodiments, when there is only one dimension, the process 900 may include: applying weighting along a volume of output matching a determined sentiment such that 100% weighting is applied to an SME who has produced the most corresponding to the determined sentiment; and retraining the machine learning model on the volume of output matching the determined sentiment.

In some embodiments, when there is a plurality of dimensions, the process 900 may include: applying weighting along the plurality of dimensions such that each one of the plurality of dimensions carries a percentage weight of the total 100% where the percentages at start are divided equally; and retraining the machine learning model on the percentage weights assigned to the plurality of dimensions.

In some embodiments, the SBCAD 402 may include a memory (e.g., a memory 106 as illustrated in FIG. 1) which may be a non-transitory computer readable medium that may be configured to store instructions for implementing a platform, language, database, and cloud agnostic SBCAM 406 configured to source human power and knowledge data in an easy and efficient way across multiple organizations, teams, or large companies based on multiple data sources, that stays evergreen based on reinforcement learning and holding contracts for governance or audit as disclosed herein. The SBCAD 402 may also include a medium reader (e.g., a medium reader 112 as illustrated in FIG. 1) which may be configured to read any one or more sets of instructions, e.g., software, from any of the memories described herein. The instructions, when executed by a processor embedded within the SBCAM 406 or within the SBCAD 402, may be used to perform one or more of the methods and processes as described herein. In a particular embodiment, the instructions may reside completely, or at least partially, within the memory 106, the medium reader 112, and/or the processor 104 (see FIG. 1) during execution by the SBCAD 402.

In some embodiments, the instructions, when executed, may cause a processor embedded within the SBCAM 406 or the SBCAD 402 to perform the following: implementing a database that stores a set of known criteria data having either an equally distributed weighted percentage or adjustable weighted percentages to match an outcome state corresponding to the skill-based contract assignment; establishing a communication link among a user interface, a machine learning model, and the database via a communication interface; training the machine learning model on the set of known criteria data; receiving a request, via the user interface, from a user to assign a contract for completing the particular project or the program by selecting criteria determining data; applying, upon receiving the request, by the trained machine learning model, a weight to the selected criteria determining data; generating, by the trained machine learning model, a forced-rank list of SMEs with rankings and contact information based on applying the weight; transmitting the forced-rank list to the user interface; receiving user input from the user, via the user interface, establishing an agreement to select an SME from the forced-rank list; transmitting an electronic message to the selected SME to accept the agreement; setting the agreement into a contract on a blockchain upon receiving acceptance from the selected SME, to ensure accuracy, encryption, and that none of the data that has been utilized to generate the contract can be accessed without the user and the selected SME's knowledge, but the disclosure is not limited thereto. In some embodiments, the processor may be the same or similar to the processor 104 as illustrated in FIG. 1 or the processor embedded within the SBCAD 202, SBCAD 302, SBCAD 402, and SBCAM 406 which is the same or similar to the processor 104.

In some embodiments, the instructions, when executed, may cause the processor 104 to further perform the following: selecting, by the user, the criteria determining data details giving the user an outcome of who would be in a forced-rank order, the most appropriate SME or SMEs qualified to assist the user for completing the particular project or the program.

In some embodiments, the instructions, when executed, may cause the processor 104 to further perform the following: transmitting a verification or survey to the user interface to receive user verification data or survey data as to why the user selected this particular SME from the forced-rank list.

In some embodiments, the instructions, when executed, may cause the processor 104 to further perform the following: retraining the machine learning model on the received verification data or the survey data; and outputting a reinforcement learning model.

In some embodiments, in automatically adjusting weights, the instructions, when executed, may cause the processor 104 to further perform the following: adjusting weights for an SME who has availability; and ranking said SME who has availability higher in the forced-rank list compared to SMEs who do not have availability.

In some embodiments, in automatically adjusting weights, the instructions, when executed, may cause the processor 104 to further perform the following: adjusting weights for an SME who has been selected the most previously by the user or other users; and ranking said SME who has been selected the most previously highest in the forced-rank list compared to other SMEs.

In some embodiments, when there is only one dimension, the instructions, when executed, may cause the processor 104 to further perform the following: applying weighting along a volume of output matching a determined sentiment such that 100% weighting is applied to an SME who has produced the most corresponding to the determined sentiment; and retraining the machine learning model on the volume of output matching the determined sentiment.

In some embodiments, when there is a plurality of dimensions, the instructions, when executed, may cause the processor 104 to further perform the following: applying weighting along the plurality of dimensions such that each one of the plurality of dimensions carries a percentage weight of the total 100% where the percentages at start are divided equally; and retraining the machine learning model on the percentage weights assigned to the plurality of dimensions.

In some embodiments as disclosed above in FIGS. 1-9, technical improvements effected by the instant disclosure may include a platform for implementing a platform, language, database, and cloud agnostic skill-based contract assignment module configured to source human power and knowledge data in an easy and efficient way across multiple organizations, teams, or large companies based on multiple data sources, that stays evergreen based on reinforcement learning and holding contracts for governance or audit, but the disclosure is not limited thereto. Therefore, users can instantly gain insight into hallucination probability and revise a query accordingly.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, may be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for enabling skill-based contract assignment for completing a particular project or a program by utilizing one or more processors along with allocated memory, the method comprising:

implementing, by utilizing a platform, language, database, and cloud agnostic skill-based contract assignment module configured to source human power and knowledge data across multiple organizations, teams, or large companies based on multiple data sources, that stays evergreen based on reinforcement learning and holding contracts for governance or audit, a database that stores a set of known criteria data having either an equally distributed weighted percentage or adjustable weighted percentages to match an outcome state corresponding to the skill-based contract assignment;

establishing a communication link among a user interface, a machine learning model, and the database via a communication interface;

training the machine learning model on the set of known criteria data;

receiving a request, via the user interface, from a user to assign a contract for completing the particular project or the program by selecting criteria determining data;

applying, upon receiving the request, by the trained machine learning model, a weight to the selected criteria determining data;

generating, by the trained machine learning model, a list of subject matter experts (SMEs) with rankings and contact information based on applying the weight;

transmitting the list to the user interface;

receiving user input from the user, via the user interface, establishing an agreement to select an SME from the list;

transmitting an electronic message to the selected SME to accept the agreement;

setting the agreement into a contract on a blockchain upon receiving acceptance from the selected SME such that none of the data that has been utilized to generate the contract can be accessed without the user and the selected SME's knowledge;

transmitting a verification or survey to the user interface to receive user verification data or survey data as to why the user selected this particular SME from the list;

retraining the machine learning model on the received verification data or the survey data; and outputting a reinforcement learning model, wherein the reinforcement learning model automatically adjusts weights such that utilization and engagement with the user interface increases over time, wherein the skill-based contract assignment module is platform, language, database, browser, and cloud agnostic that allows for consistent easy orchestration and passing of data through various components to output a desired result regardless of platform, browser, language, database, and cloud environment by writing programs accordingly, and wherein applications in connection with enabling the skill-based contract assignment are operative in a cloud-based computing environment, are executed within or as virtual machines (VMs) or virtual servers that are managed in a cloud-based computing environment, and the applications are running in one or more VMs executing on the skill-based contract assignment module, and the VMs are managed or supervised by a hypervisor.

2. The method according to claim 1, further comprising:

selecting, by the user, the criteria determining data details giving the user an outcome of SMEs in an order of qualification to assist the user for completing the particular project or the program.

3. The method according to claim 1, wherein in automatically adjusting weights, the method further comprising:

adjusting weights for an SME who has availability; and ranking said SME who has availability higher in the list compared to SMEs who do not have availability.

4. The method according to claim 1, wherein in automatically adjusting weights, the method further comprising:

adjusting weights for an SME who has been selected the most previously by the user or other users; and ranking said SME who has been selected the most previously highest in the list compared to other SMEs.

5. The method according to claim 1, wherein when there is only one dimension, the method further comprising:

applying weighting along a volume of output matching a determined sentiment such that 100% weighting is applied to an SME who has produced the most corresponding to the determined sentiment; and retraining the machine learning model on the volume of output matching the determined sentiment.

6. The method according to claim 1, wherein when there is a plurality of dimensions, the method further comprising:

applying weighting along the plurality of dimensions such that each one of the plurality of dimensions carries a percentage weight of the total 100% where the percentages at start are divided equally; and retraining the machine learning model on the percentage weights assigned to the plurality of dimensions.

7. A system for enabling skill-based contract assignment for completing a particular project or a program, the system comprising:

a processor; and a memory operatively connected to the processor via a communication interface, the memory storing computer readable instructions, when executed, causes the processor to:

implement, by utilizing a platform, language, database, and cloud agnostic skill-based contract assignment module configured to source human power and knowledge data across multiple organizations, teams, or large companies based on multiple data sources, that stays evergreen based on reinforcement learning and holding contracts for governance or audit, a database that stores a set of known criteria data having either an equally distributed weighted percentage or adjustable weighted percentages to match an outcome state corresponding to the skill-based contract assignment;

establish a communication link among a user interface, a machine learning model, and the database via a communication interface;

train the machine learning model on the set of known criteria data;

receive a request, via the user interface, from a user to assign a contract for completing the particular project or the program by selecting criteria determining data;

apply, upon receiving the request, by the trained machine learning model, a weight to the selected criteria determining data;

generate, by the trained machine learning model, a list of subject matter experts (SMEs) with rankings and contact information based on applying the weight;

transmit the list to the user interface;

receive user input from the user, via the user interface, establishing an agreement to select an SME from the list;

transmit an electronic message to the selected SME to accept the agreement;

set the agreement into a contract on a blockchain upon receiving acceptance from the selected SME, such that none of the data that has been utilized to generate the contract can be accessed without the user and the selected SME's knowledge;

transmit a verification or survey to the user interface to receive user verification data or survey data as to why the user selected this particular SME from the list;

retrain the machine learning model on the received verification data or the survey data; and output a reinforcement learning model, wherein the reinforcement learning model automatically adjusts weights such that utilization and engagement with the user interface increases over time, wherein the skill-based contract assignment module is platform, language, database, browser, and cloud agnostic that allows for consistent easy orchestration and passing of data through various components to output a desired result regardless of platform, browser, language, database, and cloud environment by writing programs accordingly, and wherein applications in connection with enabling the skill-based contract assignment are operative in a cloud-based computing environment, are executed within or as virtual machines (VMs) or virtual servers that are managed in a cloud-based computing environment, and the applications are running in one or more VMs executing on the skill-based contract assignment module, and the VMs are managed or supervised by a hypervisor.

8. The system according to claim 7, wherein the processor is further configured to:

select, by the user, the criteria determining data details giving the user an outcome of SMEs in an order of qualification to assist the user for completing the particular project or the program.

9. The system according to claim 7, in automatically adjusting weights, the processor is further configured to:

adjust weights for an SME who has availability; and rank said SME who has availability higher in the list compared to SMEs who do not have availability.

10. The system according to claim 7, in automatically adjusting weights, the processor is further configured to:

adjust weights for an SME who has been selected the most previously by the user or other users; and rank said SME who has been selected the most previously highest in the list compared to other SMEs.

11. The system according to claim 7, when there is only one dimension, the processor is further configured to:

apply weighting along a volume of output matching a determined sentiment such that 100% weighting is applied to an SME who has produced the most corresponding to the determined sentiment; and retrain the machine learning model on the volume of output matching the determined sentiment.

12. The system according to claim 7, when there is a plurality of dimensions, the processor is further configured to:

apply weighting along the plurality of dimensions such that each one of the plurality of dimensions carries a percentage weight of the total 100% where the percentages at start are divided equally; and retrain the machine learning model on the percentage weights assigned to the plurality of dimensions.

13. A non-transitory computer readable medium configured to store instructions for enabling skill-based contract assignment for completing a particular project or a program, the instructions, when executed, cause a processor to perform the following:

implementing, by utilizing a platform, language, database, and cloud agnostic skill-based contract assignment module configured to source human power and knowledge data across multiple organizations, teams, or large companies based on multiple data sources, that stays evergreen based on reinforcement learning and holding contracts for governance or audit, a database that stores a set of known criteria data having either an equally distributed weighted percentage or adjustable weighted percentages to match an outcome state corresponding to the skill-based contract assignment;

establishing a communication link among a user interface, a machine learning model, and the database via a communication interface;

training the machine learning model on the set of known criteria data;

receiving a request, via the user interface, from a user to assign a contract for completing the particular project or the program by selecting criteria determining data;

applying, upon receiving the request, by the trained machine learning model, a weight to the selected criteria determining data;

generating, by the trained machine learning model, a list of subject matter experts (SMEs) with rankings and contact information based on applying the weight;

transmitting the list to the user interface;

receiving user input from the user, via the user interface, establishing an agreement to select an SME from the list;

transmitting an electronic message to the selected SME to accept the agreement;

setting the agreement into a contract on a blockchain upon receiving acceptance from the selected SME such that none of the data that has been utilized to generate the contract can be accessed without the user and the selected SME's knowledge;

transmitting a verification or survey to the user interface to receive user verification data or survey data as to why the user selected this particular SME from the list;

retraining the machine learning model on the received verification data or the survey data; and outputting a reinforcement learning model, wherein the reinforcement learning model automatically adjusts weights such that utilization and engagement with the user interface increases over time, wherein the skill-based contract assignment module is platform, language, database, browser, and cloud agnostic that allows for consistent easy orchestration and passing of data through various components to output a desired result regardless of platform, browser, language, database, and cloud environment by writing programs accordingly, and wherein applications in connection with enabling skill-based contract assignment are operative in a cloud-based computing environment, are executed within or as virtual machines (VMs) or virtual servers that are managed in a cloud-based computing environment, and the applications are running in one or more VMs executing on the skill-based contract assignment module, and the VMs are managed or supervised by a hypervisor.

14. The non-transitory computer readable medium according to claim 13, the instructions, when executed, cause the processor to further perform the following:

selecting, by the user, the criteria determining data details giving the user an outcome of SMEs in an order of qualification to assist the user for completing the particular project or the program.

15. The non-transitory computer readable medium according to claim 13, wherein in automatically adjusting weights, the instructions, when executed, cause the processor to further perform the following:

adjusting weights for an SME who has availability; and ranking said SME who has availability higher in the list compared to SMEs who do not have availability.

16. The non-transitory computer readable medium according to claim 13, wherein in automatically adjusting weights, the instructions, when executed, cause the processor to further perform the following:

adjusting weights for an SME who has been selected the most previously by the user or other users; and ranking said SME who has been selected the most previously highest in the list compared to other SMEs.

17. The non-transitory computer readable medium according to claim 13, wherein when there is only one dimension, the instructions, when executed, cause the processor to further perform the following:

applying weighting along a volume of output matching a determined sentiment such that 100% weighting is applied to an SME who has produced the most corresponding to the determined sentiment; and retraining the machine learning model on the volume of output matching the determined sentiment.

18. The non-transitory computer readable medium according to claim 13, wherein when there is a plurality of dimensions, the instructions, when executed, cause the processor to further perform the following:

applying weighting along the plurality of dimensions such that each one of the plurality of dimensions carries a percentage weight of the total 100% where the percentages at start are divided equally; and retraining the machine learning model on the percentage weights assigned to the plurality of dimensions.

* * * * *